United States Patent
Baus (10) Patent No.: US 10,773,327 B2
(45) Date of Patent: Sep. 15, 2020

(54) SYSTEM AND METHOD FOR LIMITING WELDING OUTPUT AND ANCILLARY FEATURES

(75) Inventor: George Harold Baus, Kimberly, WI (US)

(73) Assignee: Illinois Tool Works Inc., Glenview, IL (US)

( * ) Notice: Subject to any disclaimer, the term of this patent is extended or adjusted under 35 U.S.C. 154(b) by 777 days.

(21) Appl. No.: 13/105,580

(22) Filed: May 11, 2011

(65) Prior Publication Data
US 2011/0309053 A1  Dec. 22, 2011

Related U.S. Application Data

(60) Provisional application No. 61/355,985, filed on Jun. 17, 2010.

(51) Int. Cl.
*B23K 9/095* (2006.01)
*B23K 9/10* (2006.01)

(52) U.S. Cl.
CPC ............ *B23K 9/095* (2013.01); *B23K 9/1062* (2013.01)

(58) Field of Classification Search
CPC ..... B23K 11/24; B23K 11/248; B23K 11/252; B23K 9/095; B23K 9/1062; B23K 9/10; B23K 9/0953; B23K 9/0956; B23K 9/0673; B23K 9/073; B23K 9/09; B23K 9/1006; B23K 9/1081; G05B 15/02; G05F 1/66
USPC ........................................ 219/108, 133, 134
IPC .............................. B23K 11/24,11/248, 11/252
See application file for complete search history.

(56) References Cited

U.S. PATENT DOCUMENTS

| | | | | |
|---|---|---|---|---|
| 4,816,647 A | * | 3/1989 | Payne | F24C 15/106 219/448.12 |
| 5,325,522 A | * | 6/1994 | Vaughn | G05B 23/0272 |
| 5,591,362 A | | 1/1997 | Feldhausen | |
| 5,805,422 A | | 9/1998 | Crater et al. | |
| 5,805,442 A | * | 9/1998 | Crater et al. | 700/9 |
| 5,808,885 A | * | 9/1998 | Dew | B23K 9/0953 219/110 |

(Continued)

FOREIGN PATENT DOCUMENTS

EP  0041585     12/1981
EP  1681122  *  7/2006

OTHER PUBLICATIONS

International Search Report for application No. PCT/US2011/040401 dated Sep. 23, 2011.
Canadian Office Action Appln. No. 2,802,864 dated Mar. 26, 2019.

*Primary Examiner* — Ibrahime A Abraham
*Assistant Examiner* — Frederick F Calvetti
(74) *Attorney, Agent, or Firm* — McAndrews, Held & Malloy, Ltd.

(57) ABSTRACT

A system and method for limiting welding output and ancillary features is provided. In one embodiment, a portable generator system includes a power generator configured to generate electrical power appropriate for welding or plasma cutting. The generator system also includes power conversion circuitry coupled to the power generator and configured to receive power from the power generator and to provide output power. The generator system includes at least operator accessible input for receiving an operator input parameter. The generator system also includes an output power limiting device not adjustable by the operator and configured to selectively limit output power from the power conversion circuitry.

12 Claims, 4 Drawing Sheets

(56) References Cited

U.S. PATENT DOCUMENTS

| | | | | | |
|---|---|---|---|---|---|
| 5,925,268 | A * | 7/1999 | Britnell | | B23K 26/032 219/121.63 |
| 5,961,867 | A * | 10/1999 | McWilliams | | H05B 3/746 219/446.1 |
| 6,040,555 | A * | 3/2000 | Tiller | | B23K 9/1087 219/132 |
| 6,107,601 | A * | 8/2000 | Shimogama | | B23K 9/1037 219/130.01 |
| 6,396,032 | B1 * | 5/2002 | Denny | | F23N 5/242 219/501 |
| 6,410,066 | B1 * | 6/2002 | Weng | | A23L 3/003 426/231 |
| 6,486,439 | B1 * | 11/2002 | Spear | | B23K 9/1062 219/136 |
| 6,486,453 | B1 * | 11/2002 | Bales | | H05B 6/6435 219/400 |
| 6,518,995 | B1 * | 2/2003 | Ghole | | E21B 29/10 348/143 |
| 6,525,301 | B1 * | 2/2003 | Graves | | H05B 6/6435 219/482 |
| 6,624,388 | B1 * | 9/2003 | Blankenship | | B23K 9/1062 219/130.5 |
| 6,636,776 | B1 * | 10/2003 | Barton | | B23K 9/1062 219/109 |
| 6,660,967 | B2 * | 12/2003 | Brofft et al. | | 219/133 |
| 6,841,760 | B2 * | 1/2005 | Whipple, Jr. | | F24C 7/087 219/395 |
| 7,642,487 | B2 * | 1/2010 | Silvestro | | 219/133 |
| 7,643,890 | B1 * | 1/2010 | Hillen | | B23K 9/0953 340/3.1 |
| 7,745,946 | B2 * | 6/2010 | Ambrose | | 290/1 A |
| 7,868,269 | B2 * | 1/2011 | Silvestro | | 219/133 |
| 8,106,530 | B2 * | 1/2012 | Schindler | | H02J 1/14 307/35 |
| 8,115,328 | B2 * | 2/2012 | Fosbinder | | B23K 9/1006 290/1 A |
| 8,125,094 | B2 * | 2/2012 | Radtke | | B23K 9/10 290/40 B |
| 8,338,971 | B2 * | 12/2012 | Radtke | | B23K 9/10 290/1 A |
| 8,477,018 | B2 * | 7/2013 | Eluard | | G11B 27/11 340/10.5 |
| RE45,398 | E * | 3/2015 | Wallace | | B23K 9/0953 219/124.34 |
| 2002/0168937 | A1 * | 11/2002 | Clark | | B23K 9/1062 455/41.1 |
| 2003/0074275 | A1 * | 4/2003 | Salle | | G06Q 30/06 705/80 |
| 2003/0218531 | A1 * | 11/2003 | Asakage | | B60R 25/2009 340/5.2 |
| 2004/0019410 | A1 * | 1/2004 | Papallo | | G06F 1/12 700/292 |
| 2004/0068678 | A1 * | 4/2004 | Li | | G06F 11/3624 714/38.1 |
| 2005/0197115 | A1 * | 9/2005 | Clark | | B23K 9/0953 455/426.1 |
| 2006/0027546 | A1 * | 2/2006 | Reynolds | | B23K 9/1087 219/132 |
| 2006/0027547 | A1 * | 2/2006 | Silvestro | | 219/133 |
| 2006/0169682 | A1 * | 8/2006 | Kainec | | B23K 31/00 219/125.1 |
| 2006/0231375 | A1 * | 10/2006 | Kleinhans | | H03K 17/96 200/600 |
| 2007/0045259 | A1 * | 3/2007 | Beeson | | B23K 9/1006 219/133 |
| 2007/0296223 | A1 * | 12/2007 | Saylor | | F02B 63/04 290/1 R |
| 2008/0208387 | A1 * | 8/2008 | DiVenere | | B23K 31/12 700/145 |
| 2008/0264922 | A1 * | 10/2008 | Fosbinder | | 219/133 |
| 2008/0281664 | A1 * | 11/2008 | Campbell | | 705/8 |
| 2009/0039064 | A1 * | 2/2009 | Enyedy | | 219/132 |
| 2009/0109128 | A1 | 4/2009 | Nangle | | |
| 2009/0194067 | A1 * | 8/2009 | Peotter | | B66C 23/42 123/350 |
| 2009/0260059 | A1 * | 10/2009 | West | | H04L 63/105 726/3 |
| 2009/0313549 | A1 * | 12/2009 | Casner | | B23K 9/0953 715/740 |
| 2010/0012635 | A1 * | 1/2010 | Wierschke et al. | | 219/130.1 |
| 2010/0193489 | A1 * | 8/2010 | Beeson et al. | | 219/133 |
| 2010/0194118 | A1 * | 8/2010 | Radtke | | B23K 9/10 290/40 B |
| 2010/0230393 | A1 * | 9/2010 | Hillen | | B23K 9/095 219/130.33 |
| 2011/0060476 | A1 * | 3/2011 | Iino | | H02J 3/14 700/297 |
| 2011/0086611 | A1 | 4/2011 | Klein | | |
| 2011/0114611 | A1 | 5/2011 | Cole | | |
| 2011/0155710 | A1 * | 6/2011 | Farah | | B23K 9/1068 219/133 |
| 2011/0180043 | A1 * | 7/2011 | Falkowski | | F02D 37/02 123/478 |
| 2011/0180522 | A1 * | 7/2011 | Bunker | | B23K 9/1056 219/130.21 |
| 2011/0199189 | A1 * | 8/2011 | Eluard | | G06K 19/0723 340/10.5 |
| 2012/0022882 | A1 * | 1/2012 | Hillen | | B23K 9/10 705/1.1 |
| 2012/0138587 | A1 * | 6/2012 | Fosbinder et al. | | 219/133 |
| 2014/0013478 | A1 * | 1/2014 | Cole | | A61F 9/06 2/8.2 |
| 2014/0038144 | A1 * | 2/2014 | Daniel | | B23K 9/0953 434/234 |
| 2015/0054291 | A1 * | 2/2015 | Stahlkopf | | F01K 13/02 290/1 R |
| 2016/0037966 | A1 * | 2/2016 | Chin | | A47J 37/0682 426/231 |

* cited by examiner

SYSTEM AND METHOD FOR LIMITING WELDING OUTPUT AND ANCILLARY FEATURES

CROSS REFERENCE TO RELATED APPLICATIONS

This application is a Non-Provisional patent application of U.S. Provisional Patent Application No. 61/355,985 entitled "Generator/Welder Output Selector", filed Jun. 17, 2010, which is herein incorporated by reference.

BACKGROUND

The invention relates generally to generator systems and, more particularly, to a system and method for limiting welding output and ancillary features.

Portable engine-driven generators are commonly used to provide electrical power in locations where conventional electrical power is not readily available. Both gasoline and diesel engines are used to drive such generators, and the power produced is typically 120 VAC and/or 240 VAC. One specific generator application is for welding processes and these units are commonly known as portable engine-driven welders. These units include a control system to regulate the power produced by the generator, thereby making it suitable for an arc welding operation. Typical welding operations for which these units are often intended include stick electrode welding, metal inert gas (MIG) welding, tungsten inert gas (TIG) welding, or plasma torch cutting, although in some cases limited process selection is provided.

Increasingly, a rental market has developed for portable engine-driven welders. Renting establishments may, for example, provide the portable engine-driven welder attached to a trailer for easily transporting the welder, or smaller welders may be placed in a work vehicle. The renting establishment may desire to provide the portable engine-driven welder to customers having a variety of needs. For example, customers may desire only certain features incorporated into the portable engine-driven welder. When possible, an appropriate machine may be selected that accords with the needs of the renter, with rental rates being charged accordingly. However, in many cases, available equipment may simply be larger, of greater power capacity, or more feature-rich than the renter needs. There is, at present, little flexibility in the ability of the renting establishment to tailor the equipment to the particular needs of individual renters, with rental rates being adjusted accordingly. As such, there is a need in the field for devices or methods that might allow for more flexible adaptation of features of portable engine-driven welders that might address such situations.

BRIEF DESCRIPTION

In an exemplary embodiment, a portable generator system includes a power generator configured to generate electrical power appropriate for welding or plasma cutting. The generator system also includes power conversion circuitry coupled to the power generator and configured to receive power from the power generator and to provide output power. The generator system includes at least one operator accessible input for receiving an operator input parameter. The generator system also includes an output power limiting device not adjustable by the operator and configured to selectively limit output power from the power conversion circuitry. Output may be limited to particular welding power levels, voltage levels, current levels, time period, but also to make available or not available auxiliary power, power for lighting and/or hand tools, and so forth. Output may also be limited by particular processes, such as welding processes that are available or not available to the operator.

In another embodiment, a portable engine-driven generator system includes an internal combustion engine and a power generator coupled to the internal combustion engine and configured to be driven by the internal combustion engine. The generator system also includes a means adjustable by an operator for controlling output power of the power generator. The generator system includes means not adjustable by the operator for selectively limiting output power from the power generator for use in the welding operation.

In another embodiment, a welding power supply limiting method includes receiving a rental request from a customer for a portable engine-driven generator system and determining portions of the portable engine-driven generator system to limit using parameters from the customer. The method also includes configuring the portable engine-driven generator system to limit the determined portions of the portable engine-driven generator system using an interface not accessible to the customer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
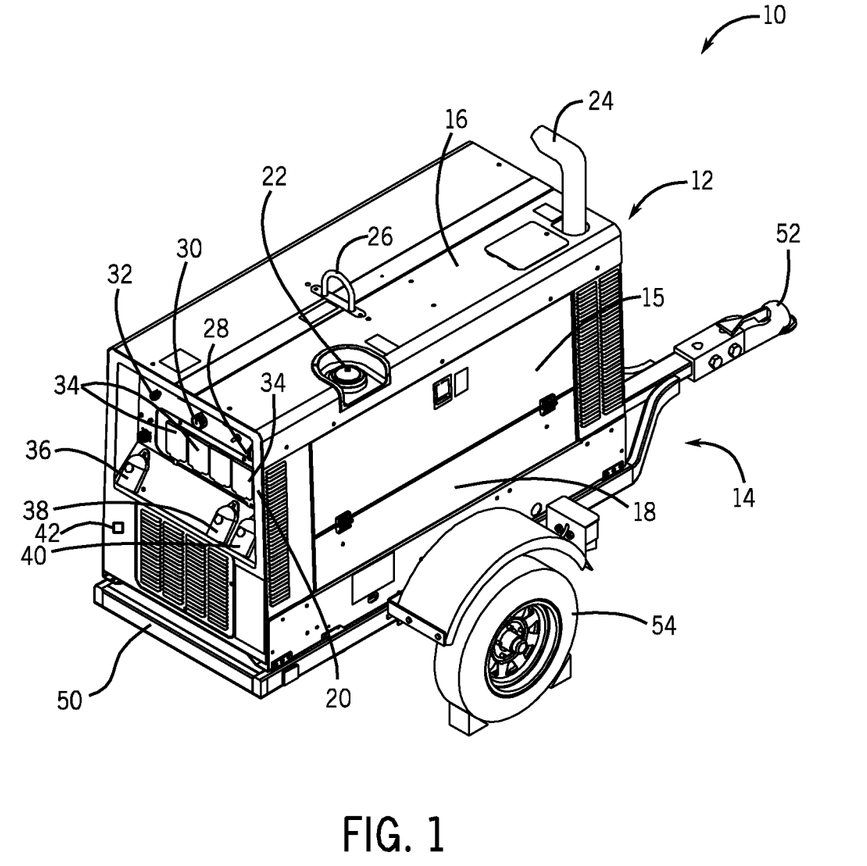
FIG. 1 is a perspective view of a portable engine-driven generator system which may employ an embodiment of an output power limiting device.

Turning now to the drawings, FIG. 1 illustrates a portable engine-driven generator system 10 which may employ an embodiment of an output power limiting device. The portable engine-driven generator system 10 includes an engine-driven generator 12 mounted to a trailer 14. The engine-driven generator 12 includes an electrical power generator that is coupled to and driven by an engine. The engine and generator are fully enclosed by an enclosure 15 which includes a top panel 16, side panels 18, and a front panel 20. The enclosure 15 protects the engine and generator from dust, debris, and rough handling. It should be noted that various sized and configurations of welding systems may be utilized, and in practice, when used by a renting establishment, multiple systems may be offered, including trailer-mounted systems, skid-mounted systems, portable systems, and so forth.

A fuel cap 22 is located on the top panel 16 and provides access to a fuel tank located within the enclosure 15. The fuel cap 22 may be removed and fuel may be added to the fuel tank for supplying necessary fuel to run the engine. An exhaust pipe 24 extends out of the top panel 16. Exhaust from the engine is directed by the exhaust pipe 24 out of the engine-driven generator 12. The top panel 16 also includes a lifting ring 26 which may be used to move the engine-driven generator 12, such as with an overhead crane.

A control circuitry within the enclosure 15 controls the operation of the engine-driven generator 12 and allows the generator 12 to be used for welding operations. As such, the front panel 20 includes various controls (e.g., knobs 28 and 30, dial 32, etc.) and connection terminals (e.g., generator power receptacles 34, work cable terminal 36, MIG welding terminal 38, and TIG welding terminal 40) that allow an operator to interact with the control circuitry. Specifically, the knob 28 may be an engine control switch for starting and stopping the engine and for selecting the engine speed. Furthermore, the knob 30 may be a voltage or amperage control used to adjust output voltage or amperage depending on the welding mode. The dial 32 may be a process or contactor switch which is used to switch between welding modes. For example, an operator may use dial 32 to switch between stick electrode welding, MIG welding, and TIG welding.

The generator power receptacles 34 provide various receptacles for using power output from the generator. For example, the generator power receptacles may include 120 VAC and 240 VAC receptacles. A work cable may be connected to terminal 36 on the left side of the front panel 20, while a welding cable for MIG welding may be connected to terminal 38 on the right side of the front panel 20. For TIG welding, a welding cable may be connected to terminal 40. In certain embodiments, the welding cable may be connected to terminal 36, while the work cable may be connected to either terminal 38 or 40.

A limiting or lockout input 42 is also located on the front panel 20. However, in certain embodiments, the input 42 may be positioned anywhere on the enclosure 15. The limiting or lockout input 42 may utilize one of many devices which can be used to limit the functionality of the engine-driven generator 12. For example, the input 42 may utilize a keyed selector switch, a connector, a keypad, or a receiver. In embodiments where the limiting input 42 uses a keyed selector, a key may be inserted by a vendor into a keyhole and rotated to select the functionality or limitations of the engine-driven generator 12. For embodiments where the limiting input 42 uses a connector, a vendor may connect a separate device or cable to the connector to provide information to the engine-driven generator 12 to limit its functionality. Specifically, in some embodiments, an enabling device (e.g., dongle) may be attached to the connector to enable functionality programmed into the enabling device. In other embodiments, a cable may connect from a computer or other programming device to the connector in order to send instructions to the engine-driven generator 12 control circuitry. When a keypad is used for the limiting input 42, a vendor may enter a code to access the device 42, and then input codes to limit or enable functionality. For embodiments where the limiting input 42 uses a receiver, the receiver may receive wireless communication from a computer or other programming device to limit or enable functionality of the engine-driven generator 12.

As may be appreciated, various functions of the engine-driven generator 12 may be limited or inhibited by the limiting input 42. For example, any welding setting (e.g., type of welding, current level, voltage level, etc.), auxiliary power output, lighting system, hydraulic system, air compression system, engine speed, time of use, or generator output power, may be limited or inhibited by the limiting input 42. For welding operations, the output power as well as particular processes may be selected to be available or not available to the user, such as to limit the output to one or more of stick welding processes, tungsten inert gas (TIG) welding processes, metal inert gas (MIG) welding processes, pulsed processes, constant voltage or constant current processes, cutting processes, and so forth. When the generator 12 receives parameters from the limiting input 42, various devices in the generator 12 may limit the functionality of the generator 12. For example, control circuitry, switches, or other devices not accessible to an operator may selectively limit functionality of the generator 12. It should also be noted that the limiting input 42 is intended to be accessible only to vendors, not to operators that may rent the generator 12. The engine-driven generator 12 is mounted to the trailer 14 to enable the engine-driven generator 12 to be transported. The trailer 14 includes a frame 50 to provide structural support for the engine-driven generator 12. A hitch 52 is attached to the frame 50 to allow the trailer 14 to be connected to a tow vehicle for transporting the portable engine-driven generator system 10. Wheels 54 are also attached to the frame 50 and support the weight of the frame and the engine-driven generator 12.

Figure 2:
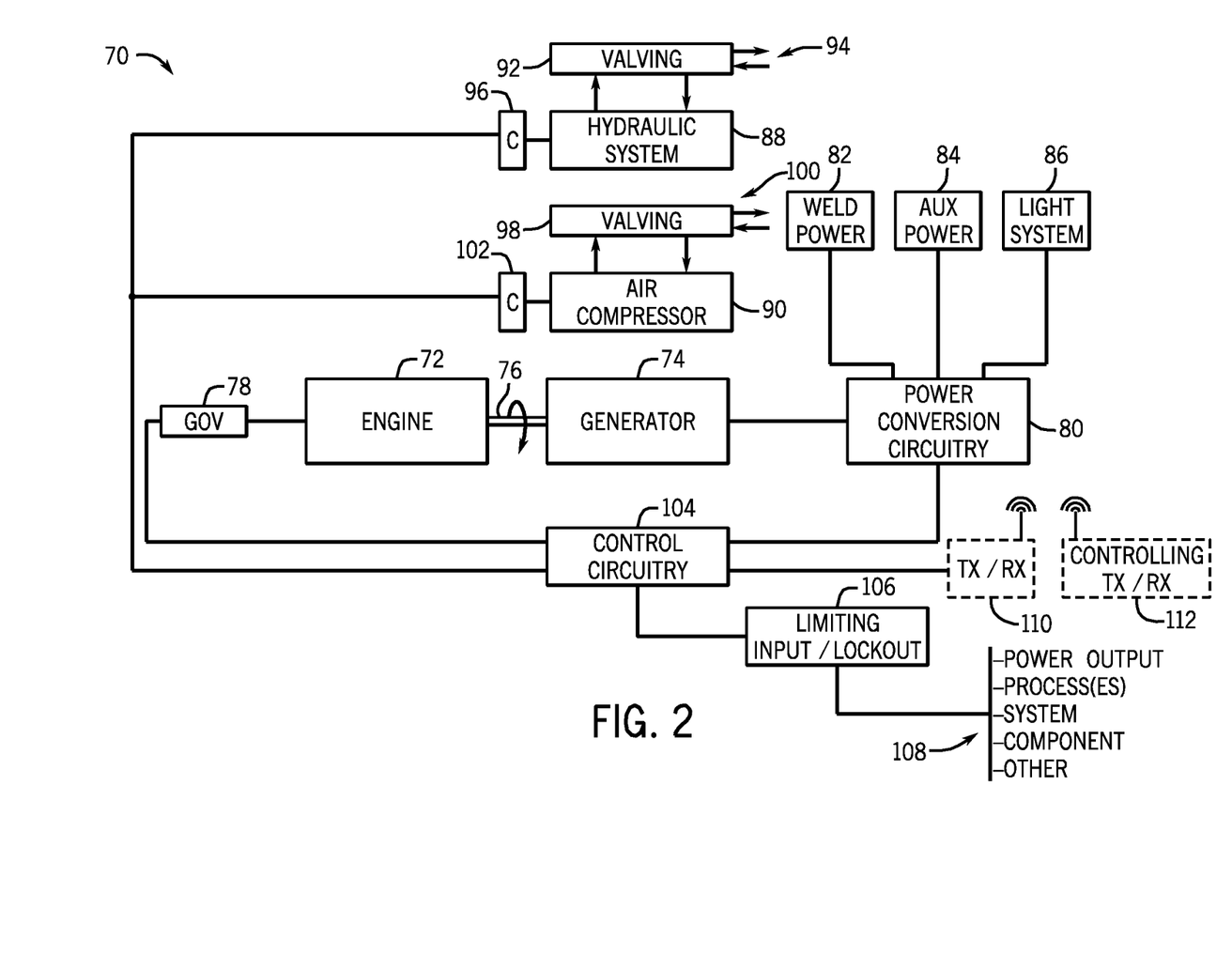
FIG. 2 is a schematic diagram of an embodiment of a portable engine-driven generator system employing an output power limiting device.

FIG. 2 is a schematic diagram of an embodiment of a portable engine-driven generator system 70 employing an output power limiting device. The system 70 includes an engine 72 coupled to a generator 74 via a shaft 76. The engine 72 may be any suitable internal combustion engine (e.g., gasoline engine, diesel engine, etc.) for driving the generator 74. For example, in certain embodiments, the engine 72 may be three-cylinder diesel engine, such as a 21.7 HP engine operating at an idle speed of approximately 1500 RPM and a welding speed of approximately 1850 RPM. Such an engine 72 may be manufactured by Caterpillar of Peoria, Ill. In another embodiment, the engine 72 may be a four-cylinder diesel engine, such as a 24.4 HP engine operating at an idle speed of approximately 1500 RPM and a welding speed of approximately 1850 RPM. Such an engine 72 may be manufactured by Mitsubishi Engine North America, Inc. of Addison, Ill. Although the engine 72 is depicted, certain embodiments may not include the engine 72. Furthermore, the system 70 may provide power appropriate for welding and/or plasma cutting operations.

The engine 72 rotates the shaft 76 to drive the generator 74 which provides power output. The available output power from the generator 74 varies based on the generator 74 and engine 72 in the system 70. For example, in certain embodiments, the generator 74 may have a rated peak power output of 12,000 watts and a rated continuous power output of 10,000 watts. However, as with engine 72, other generators and power ratings can be employed. A governor 78 is attached to the engine 72 to control the speed of the engine.

The generator 74 provides power for welding and other powered equipment that may be coupled to the system 70. Specifically, the generator 74 provides power to a power conversion circuitry 80 that may include circuit elements such as transformers, rectifiers, switches, and so forth. Such circuits are generally known in the art. In some embodiments, the power conversion circuitry 80 may be configured to convert the generator 74 output power to a weld power 82, an auxiliary power 84, and power for a light system 86. However, in other embodiments, the power conversion circuitry 80 may only be adapted to convert generator 74 output power to a weld power 82.

The weld power 82 includes welding power that may be used for any type of welding operation (e.g., stick, MIG, TIG, etc.). As such, the weld power 82 may provide current output of approximately 20 to 410 amps and voltage output of approximately 14 to 40 VDC for welding. The auxiliary power 84 may be used to power electrical equipment separate from the system 70. Therefore, in certain embodiments the generator 74 may provide 120 VAC and/or 240 VAC at approximately 60 Hz. The light system power 86 may provide power to a lighting system used in conjunction with a welding operation.

In certain embodiments, the system 70 may include a hydraulic system 88 and/or an air compressor 90. The hydraulic system 88 is coupled to valving 92 to enable hydraulic fluid to flow to and from other devices 94 to apply a usable force. For example, the hydraulic system 88 may be used for a hydraulic lift, hydraulic actuator, hydraulic motor, etc. A clutch 96 is coupled to the hydraulic system 88 and may be engaged or disengaged to control the operation of the hydraulic system 88. The air compressor 90 is coupled to valving 98 to enable air to flow to and from devices 100 that use the compressed air. For example, the air compressor 90 may be used for powering tools, providing compressed air to clean a surface, or to increase the air pressure in a device, such as a wheel. A clutch 102 is coupled to the air compressor 90 and may be engaged or disengaged to control the operation of the air compressor 90. Each clutch 96 and 102 may be any suitable clutch, such as a wrap spring clutch, belt clutch, or electric clutch. Furthermore, the clutches 96 and 102 may be coupled to the shaft 76, such as via a belt or chain, to drive the hydraulic system 88 and the air compressor 90 when the engine 72 rotates. As such, when clutch 96 is engaged, the engine 72 drives the hydraulic system 88 and when clutch 102 is engaged, the engine 72 drives the air compressor 90.

The system 70 includes control circuitry 104 which may be configured to receive and process a plurality of inputs, such as limiting or lockout inputs 106. The control circuitry 104 may use the inputs 106 to determine instructions to send to the governor 78, power conversion circuitry 80, and clutches 96 and 102 to limit and/or inhibit the output or operation of such devices. In addition, the control circuitry 104 may include volatile or non-volatile memory, such as ROM, RAM, magnetic storage memory, optical storage memory, or a combination thereof. Therefore, a variety of control parameters may be stored in the memory along with code configured to provide a specific output during operation (e.g., inhibit or limit use of weld power 82, inhibit or limit use of auxiliary power 84, inhibit use of hydraulic system 88, inhibit use of air compressor 90, etc.).

The limiting or lockout input 106 receives instructions 108 which may limit or inhibit the use of any power output, process or processes, system, component, or other feature of the system 70. Furthermore, the limiting or lockout input 106 may be a keyhole, a connector, or a keypad as previously described in relation to FIG. 1. As illustrated, the system 70 may include a transceiver 110 which may receive limiting instructions wirelessly from a controlling transceiver 112. The controlling transceiver 112 may be operated by a vendor to configure the system 70 for use by an operator renting the system 70. For example, the operator renting the system 70 may desire and pay for limited functionality, therefore the vendor may limit the functionality of the system 70 to what the operator paid for. As may be appreciated, an operator may desire increased functionality after renting the system 70. In such a condition, the operator may be at a remote location relative to the rental location. Therefore, the transceiver 110 and the controlling transceiver 112 may be configured to communicate via a cellular or internet connection to enable the vendor to configure the system 70 remotely using the controlling transceiver 112.

Specifically, in one presently contemplated scenario, an operator may enter a store to rent the system 70. A store vendor may provide the operator with a total cost to rent the system 70. However, under certain conditions, the operator may only desire some functionality of the system 70 for a reduced cost, therefore, the operator may be given a price list to use various functions or operating times of the system 70. The various functions provided to the operator may include: welding power for stick welding, welding power for MIG welding, welding power for TIG welding, welding current limited to 200 amps, welding current limited to 100 amps, auxiliary power, auxiliary power limited to 5000 watts, auxiliary power limited to 2500 watts, lighting system power, hydraulic system, and air compressor, for example. As may be appreciated, the various functions provided to the operator are not limited to the examples provided, but the examples merely represent possible configurations. In addition, an operator may be charged based on an operating time of various functions or of the complete system 70. Therefore, the system 70 may include limits on the amount of time various portions of the system 70 may be used. As such, a customer may purchase amounts of time they wish to use the system 70 or portions of the system 70. Like other purchases described, the system 70 may be programmed to be time limited using a wireless, wired, or other option.

The operator may select specific options of the system 70 to be enabled. For example, the operator may select to only enable weld power 82 for stick welding and to enable the hydraulic system 88. After the operator makes a selection of their desired features, the operator pays for those features and the vendor configures the system 70 to enable the selected features using a vendor accessible input. For example, the vendor may send wireless signals using the controlling transceiver 112 with instructions to enable or inhibit system 70 features. In some embodiments, the vendor may insert a key into the limiting input 106 to select desired features. Likewise, a keypad or cable connection may be used to send instructions to the control circuitry 104. The control circuitry 104 receives the limiting, inhibiting, and/or enabling instructions and configures the system 70 using those instructions.

For example, the control circuitry 104 may disable the hydraulic system 88 or the air compressor 90 by sending a control signal to either the clutch 96 or the clutch 102 that causes the clutch to remain disengaged. As another example, the control circuitry 104 may disable or limit the weld power 82, the auxiliary power 84, or the light system 86 by sending a control signal to the power conversion circuitry 80 instructing the power conversion circuitry 80 to disable or limit the power. Furthermore, the control circuitry 104 may send signals to the governor 78 to limit the engine speed 72. It should be noted that the limiting device or devices in the system 70 are not accessible to the operator (e.g., they are internal to the system 70 and/or protected by security codes, secure communication, or locks).

Figure 3:
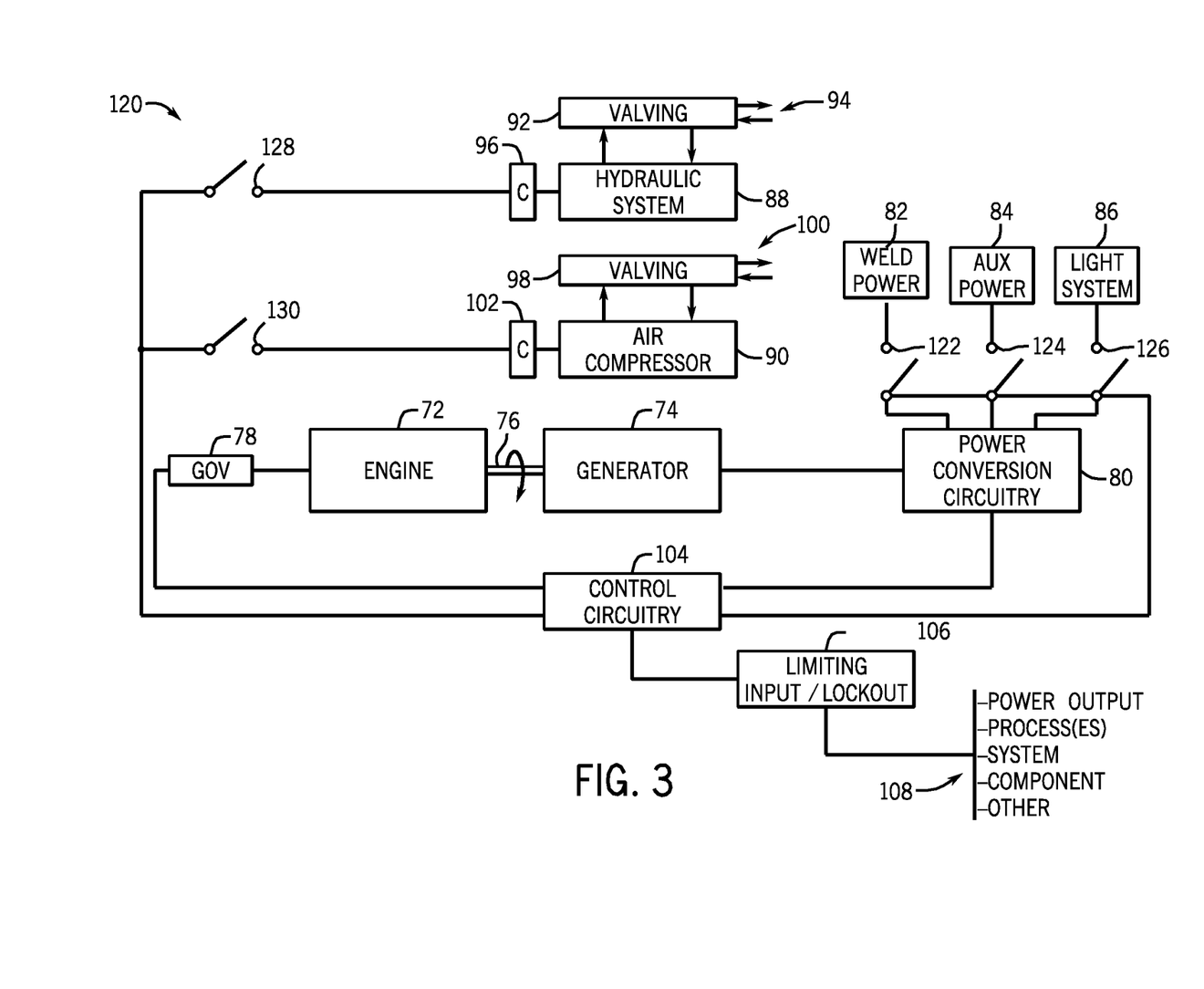
FIG. 3 is a schematic diagram of another embodiment of a portable engine-driven generator system employing an output power limiting device.

FIG. 3 is a schematic diagram of another embodiment of a portable engine-driven generator system 120 employing an output power limiting device. As illustrated by FIG. 3, switches 122, 124, 126, 128, and 130 may be used to inhibit use of portions of the system 120. The switches 122, 124, 126, 128, and 130 are controlled by the control circuitry 104. As such, the switches 122, 124, 126, 128, and 130 may be relay, solid state, or another type of switch. In certain embodiments, the switches 122, 124, 126, 128, and 130 may be manual switches that may be actuated by a vendor. In such an embodiment, the switches may be within a locked compartment of the system 120, or the switches may be selected using one or more keys or other devices which an operator is inhibited from accessing.

When a vendor inhibits an operator from using certain functionality of the system 120, the vendor sends instructions to the limiting or lockout input 106. The control circuitry 104 receives the instructions from the input 106 and limits or inhibits the functionality of the system 120 based on the limiting instructions. Furthermore, enabling instructions may be sent from the input 106 to the control circuitry 104. For example, the control circuitry may cause any of the switches 122, 124, 126, 128, and 130 to be in an open or closed position in order to enable or disable portions of the system 120. More specifically, the control circuitry 104 may transition switch 122 to a closed position to enable weld power 82 to flow from the power conversion circuitry 80. Similarly, the control circuitry 104 may configure switches 124 and 126 to enable or disable use of auxiliary power 84 and the light system 86, respectively. Furthermore, the control circuitry 104 may transition switch 128 to a closed position to enable the clutch 96 to operate, therefore enabling use of the hydraulic system 88. Similarly, the control circuitry 104 may configure switch 130 to enable or disable use of the air compressor 90. Therefore, system 120 may enable or disable the use of its devices.

Figure 4:
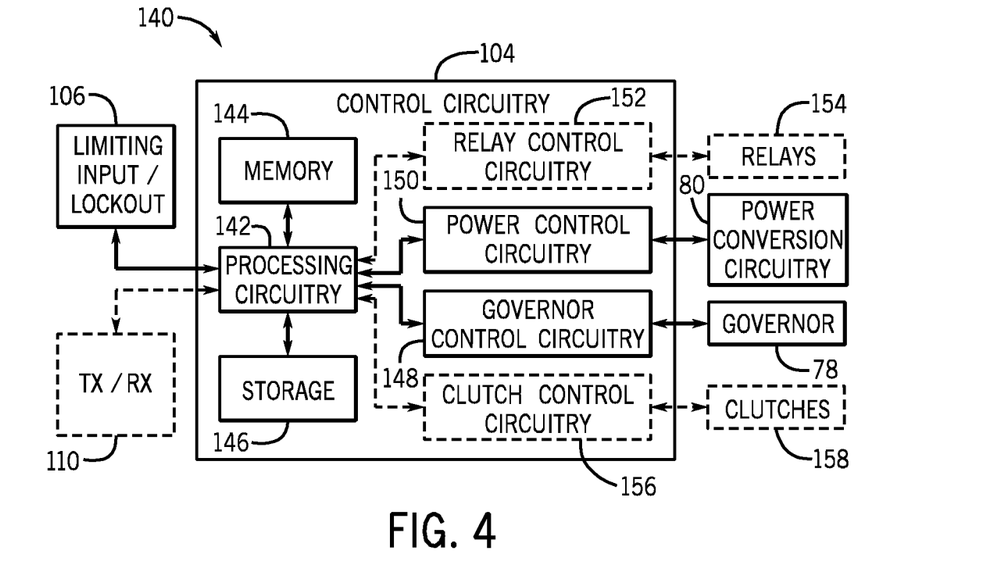
FIG. 4 is a block diagram of the control circuitry of FIG. 2 employing an embodiment of an output power limiting device.

FIG. 4 is a block diagram 140 of the control circuitry 104 of FIG. 2 employing an embodiment of an output power limiting device. Processing circuitry 142 of the control circuitry 104 may receive limiting instructions from the limiting or lockout input 106 and/or the transceiver 110. The processing circuitry 142 may use the instructions to limit the functionality of the engine-driven generator system 120. Furthermore, the processing circuitry 142 may include one or more microprocessors, such as one or more "general-purpose" microprocessors, one or more special-purpose microprocessors and/or ASICS, or some combination thereof. For example, the processing circuitry 142 may include one or more reduced instruction set (RISC) processors.

The control circuitry 104 also includes a memory device 144 and a storage device 146. The memory device 144 may include a volatile memory, such as random access memory (RAM), and/or a nonvolatile memory, such as read-only memory (ROM). In addition, the memory device 144 may store a variety of information and may be used for various purposes. For example, the memory device 144 may store processor-executable instructions (e.g., firmware or software) for the processing circuitry 142 to execute, such as instructions for limiting or inhibiting the functionality of the welding power, the auxiliary power, the lighting system power, the hydraulics system, the air compressor, etc. The storage device 146 (e.g., nonvolatile storage) may include ROM, flash memory, a hard drive, or any other suitable optical, magnetic, or solid-state storage medium, or a combination thereof. In addition, the storage device 146 may store data (e.g., security codes), instructions (e.g., software or firmware to limit functionality of the system 120), and any other suitable data.

The processing circuitry 142 is configured to communicate with governor control circuitry 148 to control the operation of the governor 78. For example, the processing circuitry 142 may instruct the governor control circuitry 148 to adjust the limit of the engine 72 speed used by the governor 78. Furthermore, the processing circuitry 142 is configured to communicate with power control circuitry 150 to control the operation of the power conversion circuitry 80. For example, the processing circuitry 142 may instruct the power control circuitry 150 to inhibit the use of auxiliary power 84 produced by the power conversion circuitry 80.

Likewise, the processing circuitry 142 is configured to communicate with relay control circuitry 152 which controls the operation of relays 154. For example, the processing circuitry 142 may instruct the relay control circuitry 152 to control the relays 154 to open the switch providing auxiliary power 84. In addition, the processing circuitry 142 is configured to communicate with clutch control circuitry 156 which controls the operation of clutches 158. For example, the processing circuitry 142 may instruct the clutch control circuitry 156 to inhibit the use of the air compressor 90 by disengaging the clutch 102. As may be appreciated, the control circuitry 104 is configured to receive limiting inputs, process the inputs, and control power outputs based on the limiting inputs. Therefore, the control circuitry 104 functions as a output power limiting device within the engine-driven generator system 70.

Figure 5:
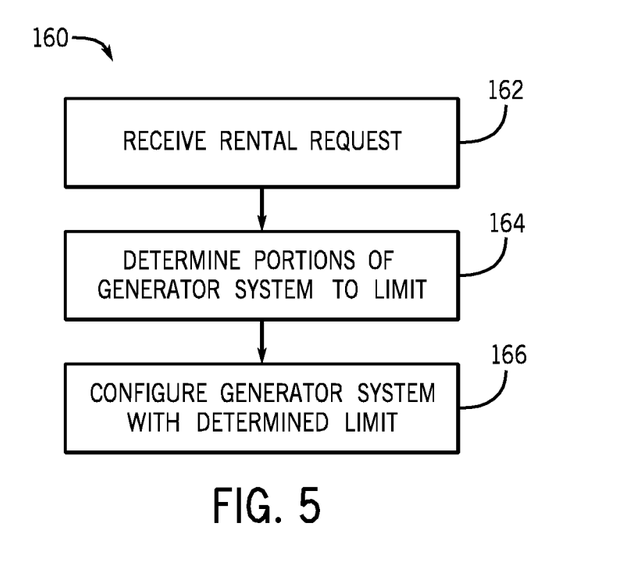
FIG. 5 is a flow chart of an embodiment of a business method for renting out a portable engine-driven generator system.

FIG. 5 is a flow chart of an embodiment of a business method 160 for renting out a portable engine-driven generator system. At step 162, a vendor may receive a rental request from a customer for a portable engine-driven generator system. Next, at step 164, the vendor and customer determine which portions of the generator system to enable, limit, or inhibit. As previously described, the vendor may enable or inhibit all portions of the generator system, or individual portions (e.g., weld power, auxiliary power, lighting system power, air compressor, and hydraulic system).

At step 166, the vendor configures the generator system with the enabling, limiting, or inhibiting instructions using an interface not accessible to the customer. For example, the vendor may use secure wireless communications, a security key, a proprietary programming device or cable, a proprietary software, or other hardware or software to configure the generator system with limiting instructions. Furthermore, in certain embodiments, the generator system may include an internal log that contains a history of what devices and systems a customer has used. Such an internal log may be viewed by the vendor in cases where a vendor suspects a customer has tampered with the generator limiting devices. With such a system, as described, vendors may rent the generator system to customers at a variable cost based on the customer needs. As may be appreciated, fewer or more steps may be included in certain embodiments. In addition, other embodiments may perform the method 160 in a different order than described.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A portable generator comprising:
a power generator configured to generate electrical power;
an internal combustion engine coupled to the power generator and configured to drive the power generator;
power conversion circuitry of the portable generator coupled to the power generator and configured to receive the electrical power from the power generator and to provide output power;
at least one operator adjustable input of the portable generator for receiving an input parameter from a first operator to control the power conversion circuitry;

an output power limiting device adjustable by a second operator and not adjustable by the first operator, the output power limiting device comprising at least one of 1) a physical keyhole configured to be rotated by a key that is inaccessible to the first operator to select a limitation of at least one determined feature of the power conversion circuitry, the power generator, or the internal combustion engine, or 2) a keypad configured to receive at least one code to input the limitation of the at least one determined feature; and control circuitry configured to control the at least one of the power generator or the power conversion circuitry to output welding power based on a specified usage time communicated to the control circuitry by the output power limiting device.

2. The portable generator claim 1, wherein the control circuitry is configured to limit at least one of power level, current level and voltage level of the output power based on the input communicated to the control circuitry with the output power limiting device.

3. The portable generator of claim 1, comprising an internal combustion engine coupled to the power generator and configured to drive the power generator.

4. The portable generator of claim 3, comprising a hydraulic system coupled to the internal combustion engine and configured to be driven by the internal combustion engine, and wherein the control circuitry is configured to limit use of the hydraulic system based on the input communicated to the control circuitry with the output power limiting device.

5. The portable generator of claim 3, comprising an air compressor coupled to the internal combustion engine and configured to be driven by the internal combustion engine, and wherein the control circuitry is configured to inhibit use of the air compressor based on the input communicated to the control circuitry with the output power limiting device.

6. The portable generator of claim 1, comprising a light system output coupled to the power conversion circuitry and configured to receive power from the power conversion circuitry, wherein the control circuitry is configured to inhibit use of the light system output based on the input communicated to the control circuitry with the output power limiting device.

7. The portable generator of claim 1, wherein control circuitry is coupled to a wireless receiver and the wireless receiver is configured to receive a wireless signal to control the control circuitry.

8. The portable generator of claim 1, wherein the control circuitry is configured to inhibit welding power from being used based on the input communicated to the control circuitry with the output power limiting device.

9. The portable generator of claim 1, wherein the power conversion circuitry is configured to provide an auxiliary power for powering an electrical device and the control circuitry is configured to inhibit auxiliary power from being used based on the input communicated to the control circuitry with the output power limiting device.

10. A portable engine-driven generator comprising:
an internal combustion engine;
a power generator coupled to the internal combustion engine and configured to be driven by the internal combustion engine;
a control input device of the portable engine-driven generator adjustable by a first operator for controlling output power of the power generator;
a limiting input device of the portable engine-driven generator adjustable by a second operator and not adjustable by the first operator, comprising at least one of 1) a physical keyhole configured to be rotated by a key that is not adjustable by the first operator to select a limitation of at least one determined feature or 2) a keypad configured to receive at least one code to input the limitation of the at least one determined feature; and
control circuitry configured to control at least one of the power generator or the internal combustion engine to output power based on a specified usage time communicated to the control circuitry by the limiting input device.

11. The portable engine-driven generator of claim 10, comprising an air compressor coupled to the internal combustion engine and configured to be driven by the internal combustion engine, wherein the limiting input device is restricted from use by the operator and the control circuitry is configured to inhibit use of the air compressor based on the input communicated to the control circuitry with the limiting input device.

12. The portable engine-driven generator of claim 10, comprising a hydraulic system coupled to the internal combustion engine and configured to be driven by the internal combustion engine, wherein the limiting input device is restricted from use by the operator and the control circuitry is configured to inhibit use of the hydraulic system based on the input communicated to the control circuitry with the limiting input device.

\* \* \* \* \*